US006654074B1

United States Patent
Ha et al.

(12)

(10) Patent No.: US 6,654,074 B1
(45) Date of Patent: Nov. 25, 2003

(54) ARRAY SUBSTRATE FOR LIQUID CRYSTAL DISPLAY DEVICE WITH SHORTING BARS EXTERNAL TO A DATA PAD AND METHOD OF MANUFACTURING THE SAME

(75) Inventors: Young-Hun Ha, Kyongbuk (KR); Seong-Su Lee, Kyongbuk (KR); Hyeung-Soo Kim, Daeku (KR)

(73) Assignee: LG. Philips LCD Co. Ltd., Seoul (KR)

( * ) Notice: Subject to any disclaimer, the term of this patent is extended or adjusted under 35 U.S.C. 154(b) by 71 days.

(21) Appl. No.: 09/695,385

(22) Filed: Oct. 25, 2000

(30) Foreign Application Priority Data

Oct. 25, 1999 (KR) ......................................... 1999-46344

(51) Int. Cl.[7] ............................................. G02F 1/1333
(52) U.S. Cl. ............................. 349/40; 349/54; 438/144
(58) Field of Search ............................. 349/54, 192, 40, 349/139; 438/144

(56) References Cited

U.S. PATENT DOCUMENTS 5,521,728 A * 5/1996 Kodate et al. ............... 349/149
5,668,032 A * 9/1997 Holmberg et al. ............ 257/59
5,936,687 A * 8/1999 Lee ............................. 345/69
6,005,647 A * 12/1999 Lim ............................ 349/139
6,128,051 A * 10/2000 Kim et al. ................... 349/192
6,184,948 B1 * 2/2001 Lee ............................. 257/443

FOREIGN PATENT DOCUMENTS

KR          95-27664          10/1995

* cited by examiner

Primary Examiner—Toan Ton
Assistant Examiner—P. R. Akkapeddi
(74) Attorney, Agent, or Firm—Birch, Stewart, Kolasch & Birch, LLP

(57) ABSTRACT

The present invention discloses an array substrate (and method for making the same) for use in a liquid crystal display device, including: gate lines arranged in a transverse direction and organized as odd and even gate lines; data lines arranged in a longitudinal direction perpendicular to the gate lines, and organized as odd and even data lines; gate shorting bars organized as odd and even gate shorting bars, the odd gate shorting bar electrically connecting all of the odd gate lines, the even gate shorting bar electrically connecting all of the even gate lines; data shorting bars organized as odd and even data shorting bars, the odd data shorting bar electrically connecting all of the odd data lines, the even data shorting bar electrically connecting all of the even data lines; and a first active line electrically connecting all of the data lines.

21 Claims, 6 Drawing Sheets

ARRAY SUBSTRATE FOR LIQUID CRYSTAL DISPLAY DEVICE WITH SHORTING BARS EXTERNAL TO A DATA PAD AND METHOD OF MANUFACTURING THE SAME

CROSS REFERENCE

This application claims the benefit of Korean Patent Application No. 1999-46344, filed on Oct. 25, 1999, under 35 U.S.C. §119, the entirety of which is hereby incorporated by reference.

BACKGROUND OF THE INVENTION

1. Field of the Invention

The present invention relates to a liquid crystal display device, and more particularly, to an array substrate for use in a liquid crystal display (LCD) device and a method of manufacturing the same.

2. Description of Related Art

A typical LCD device includes upper and lower substrates with a liquid crystal layer interposed therebetween. The upper substrate includes a color filter and a common electrode. The lower substrate includes a switching element and a pixel electrode and is called an array substrate.

FIG. 1 is a plan view illustrating an array substrate for use in a conventional LCD device. As shown in FIG. 1, the LCD device includes gate lines 13 arranged in a transverse direction and data lines 19 arranged in a longitudinal direction perpendicular to the gate lines 13. Gate pads 11 are formed at one terminal portion of the gate lines 13, and odd and even data pads 15a and 15b are formed at one terminal portion of the odd and even data lines 19a and 19b, respectively. Gate shorting bars 23 electrically connects the gate lines 13 with each other. Data shorting bars 29 electrically connect the data lines 19 with each other. Thin film transistors (TFTs) are arranged a crossing point of the gate and data lines 13 and 19. Pixel electrodes "P" are arranged on a region defined by the gate and data lines 13 and 19.

The gate line 13 includes odd and even gate lines, but one of the odd and even gate lines is not shown. The data lines 19 also include odd and even data lines 19a and 19b. The gate shorting bars includes odd and even gate shorting bars. The odd gate shorting bars connect the odd gate lines with each other, and the even gate shorting bars connect the even gate lines with each other, respectively, through the gate pads 11. The odd and even gate shorting bars are opposite to each other. The data shorting bars 29 also includes odd and even data shorting bars 29a and 29b. The odd data shorting bars 29a connect the odd data lines 19a with each other, and the even data shorting bars 29b connect the even data lines 19b with each other.

In FIG. 2 (which shows portion A of FIG. 1 in more detail), each of the TFTs includes a gate electrode 10, a source electrode 17, a drain electrode 18, and an active layer 16. The gate electrode 10 extends from the gate line 13, and the source electrode 17 extends from the data line 19. The source and drain electrodes 17 and 18 are spaced apart from each other and overlay opposite sides of the active layer 16, respectively. The drain electrode 18 is electrically connected with the pixel electrode "P" through a contact hole 5. The active layer 16 extends from an active line 28 under the data line 19.

The shorting bars 23 and 29 are provided for a short-circuit test between the two adjacent gate lines or the two adjacent data lines. In other words, in case of the data lines 19, as described above, since the odd shorting bars 29a connect the odd data lines 19a electrically and the even shorting bars 29b connect the even data lines 19b electrically, the odd and even shorting bars 19a and 19b are electrically separated from each other. Therefore, it can be tested whether the two adjacent data or gate lines are short or not.

In general, the even data shorting bar 29b is patterned along with the gate line 13, and later the odd data shorting bar 29a is formed at the same time as the data lines 19a and 19b, and then the even data shorting bar 29b is electrically connected with the odd data lines 19a while the pixel electrode P is formed. Therefore, the even data shorting bar 29b is made of the same metal as the data line, and the odd data shorting bar 29a is made of the same metal as the gate line.

The gate and data lines 13 and 19 are made of a conductive metal such as Cr, W and Mo, which are flexible materials. An insulating layer (not shown) that insulates each of the elements of the LCD device is made of $SiO_2$ or SiNx. The active layer 16 and an active line 28 are made of semiconductor material such as amorphous silicon and polysilicon, which are very hard materials. Since the active line 28 that is relatively hard is formed under the data line 19, the data line 19 is not bent, whereupon a break or open circuit condition of the data line 19 is prevented. For example, when the array substrate is bent during its conveyance, the data line 19 may be cracked, leading to the open circuit.

To complete the array substrate described above, a depositing technique, a photolithography technique, and an etching technique are repeated several times.

Of these, the etching technique includes a dry-etching and a wet-etching. The dry-etching includes a plasma dry-etching, an ion beam milling etching, and a reactive ion etching. In wet-etching, acids and other chemical solutions are used as an etching. In chemical dry-etching, for example, the plasma dry-etching, plasma is used to generate gas radicals such as fluorine radicals in order to etch any portions of a thin film that are not covered by photoresist. In physical dry-etching, for example, ion beam milling etching, an ion beam is used in order to etch any portions of a thin film that are not covered by a photoresist.

Such a dry-etching technique requires a high electric field, so that static electricity may occur and be locally accumulated on the gate and data lines formed previously during the dry-etching process that is performed several times. The accumulated charges may cause a short-circuit between the data line and the gate electrode, for example, a portion C of FIG. 2.

In other words, note that the even data shorting bar 29b is formed together with the even data lines 19b. Since the gate shorting bars 23 also serve to discharge the static charges accumulated on the gate lines 13, a short-circuit between the data line and the gate line due to the accumulated charges may not occur. In the same way, the odd data lines 19a are connected to the odd data shorting bar 29a and so the charges are discharged, a short-circuit an odd data line 19a and a gate line 13 due to the accumulated charges may not occur. However, the even data shorting bar 29b is electrically connected with the even data lines 19b at a later time, when the pixel electrode is formed. Thus charges on the even data lines 19b are not discharged during a process of manufacturing the TFT, and so a short circuit between the odd data line 19b and the gate electrode can occur due to the accumulated static charges, leading to low manufacturing yields.

For the foregoing reasons, there is a need for an array substrate having a structure that prevents the effect of the static electricity generated during a process of manufacturing a thin film transistor.

SUMMARY OF THE INVENTION

To overcome the problems described above, embodiments of the present invention provide array substrates (and methods of making the same) for use in a liquid crystal display device, which has a structure that prevents the effect of the static electricity generated during the manufacturing process.

The present invention, in part, provides an array substrate for use in a liquid crystal display device, the array substrate including: gate lines arranged in a transverse direction and organized as odd and even gate lines; data lines arranged in a longitudinal direction perpendicular to the gate lines, and organized as odd and even data lines; gate pads arranged at a terminal portion of the gate lines, and organized as odd and even gate pads; data pads arranged at a terminal portion of the data lines, and being organized as odd and even data pads; gate shorting bars and organized as odd and even gate shorting bars, the odd gate shorting bar electrically connecting all of the odd gate lines through the odd gate pad, the even gate shorting bar electrically connecting all of the even gate lines through the even gate pad; data shorting bars organized odd and even data shorting bars, the odd data shorting bar electrically connecting all of the odd data lines through the odd data pad, the even data shorting bar electrically connecting all of the even data lines through the even data pad; and a first active line arranged between the data shorting bars and the data pads and electrically connecting all of the data lines.

The array substrate can further include a second active line arranged under the data line. The first and second active lines can be arranged on the same plane. The first and second active lines can be perpendicular to each other. The array substrate further can include a third active line formed under the odd shorting bars. The first, second and third active lines can be formed from the same stratum of one or more materials and are preferably electrically connected with each other. The first, second and third active lines can be made of a semiconductor material such as amorphous silicon and polysilicon.

The present invention, also in part, provides methods of manufacturing such array substrates for use in a liquid crystal display device. The methods include: providing a first intermediate structure having gate lines and an odd data shorting bar on a base substrate, the gate lines being organized as odd and even gate lines, the odd and even gate lines being organized as odd and even gate pads at a terminal portion thereof, respectively, and a first insulating layer on the exposed surface of the base substrate and the gate lines; forming an active stratum on the first insulating layer, the active stratum having a first active line adjacent to and parallel to the odd data shorting bar; forming data lines and an even data shorting bar on the active stratum and the first insulating layer to produce a second intermediate structure, the data line being organized as odd and even data lines and being connected with the first active line, the odd and even data lines having odd and even data pads at a terminal portion thereof, respectively, the even data shorting bar electrically connecting all of the even data lines; forming a second insulating layer on the second intermediate structure; and forming a connection layer to electonically connect the odd data shorting bar with all of the odd data lines.

The active stratum can further include a second active line formed under the data lines. The first and second active lines can be perpendicular to each other.

The active stratum can further include a third active line formed under the even data shorting bar. The first, second and third active lines are preferably electrically connected with each other.

The active stratum can be made of a semiconductor material such as amorphous silicon and polysilicon.

As described above, the array substrates for use in a liquid crystal display device according to the preferred embodiment of the present invention have a structure that discharges static charges on the gate and data lines generated during a process of manufacturing the TFT. As such, a short-circuit between the data line and the gate electrode can be prevented. And, for some embodiments, since the data pad connecting portion has no step portions, a line defect such as an open circuit is prevented. As a result, the array substrate has a high manufacturing yield.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

In the accompanying drawings, like reference numerals denote like parts.

DETAILED DESCRIPTION OF PREFFERED EMBODIMENTS

Reference will now be made in detail to example embodiments of the present invention, example of which is illustrated in the accompanying drawings.

Figure 1:
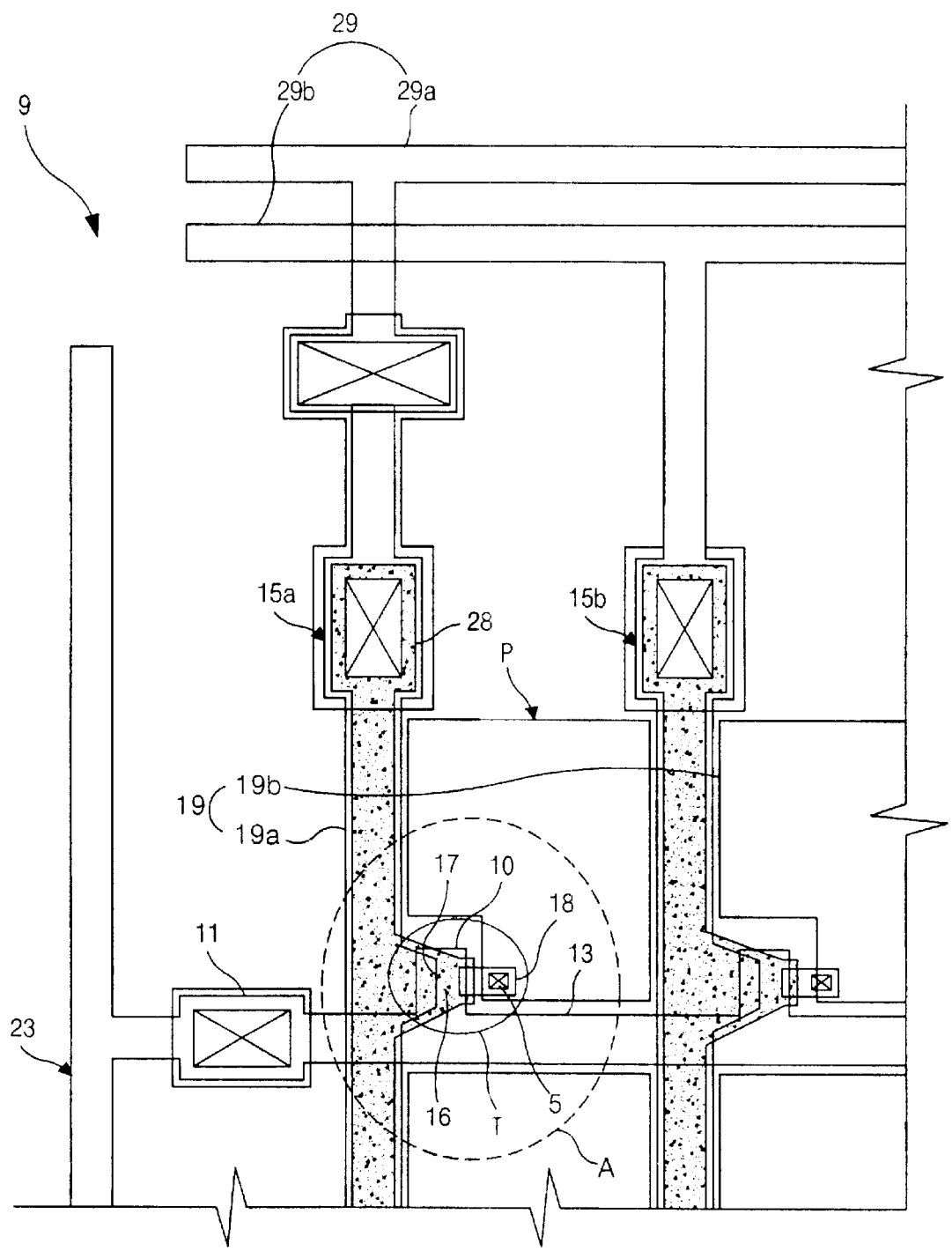
FIG. 1 is a plan view illustrating an array substrate for use in a liquid crystal display device according to the related art.
Figure 2:
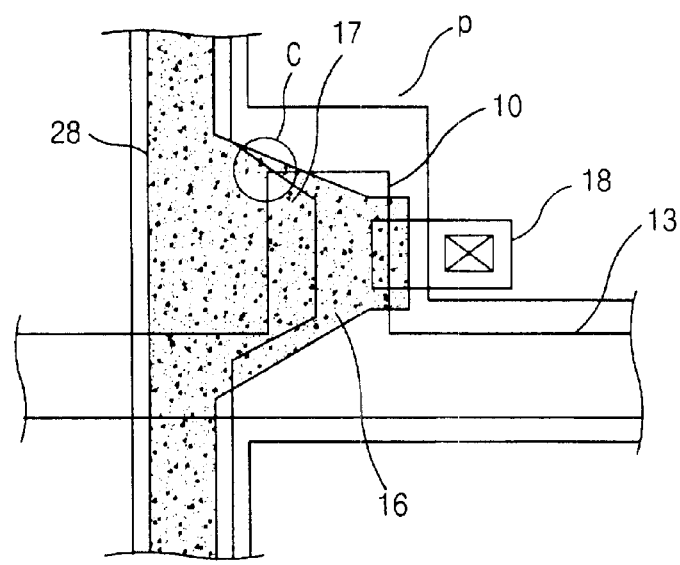
FIG. 2 is an enlarged view illustrating a portion A of FIG. 1.
Figure 3:
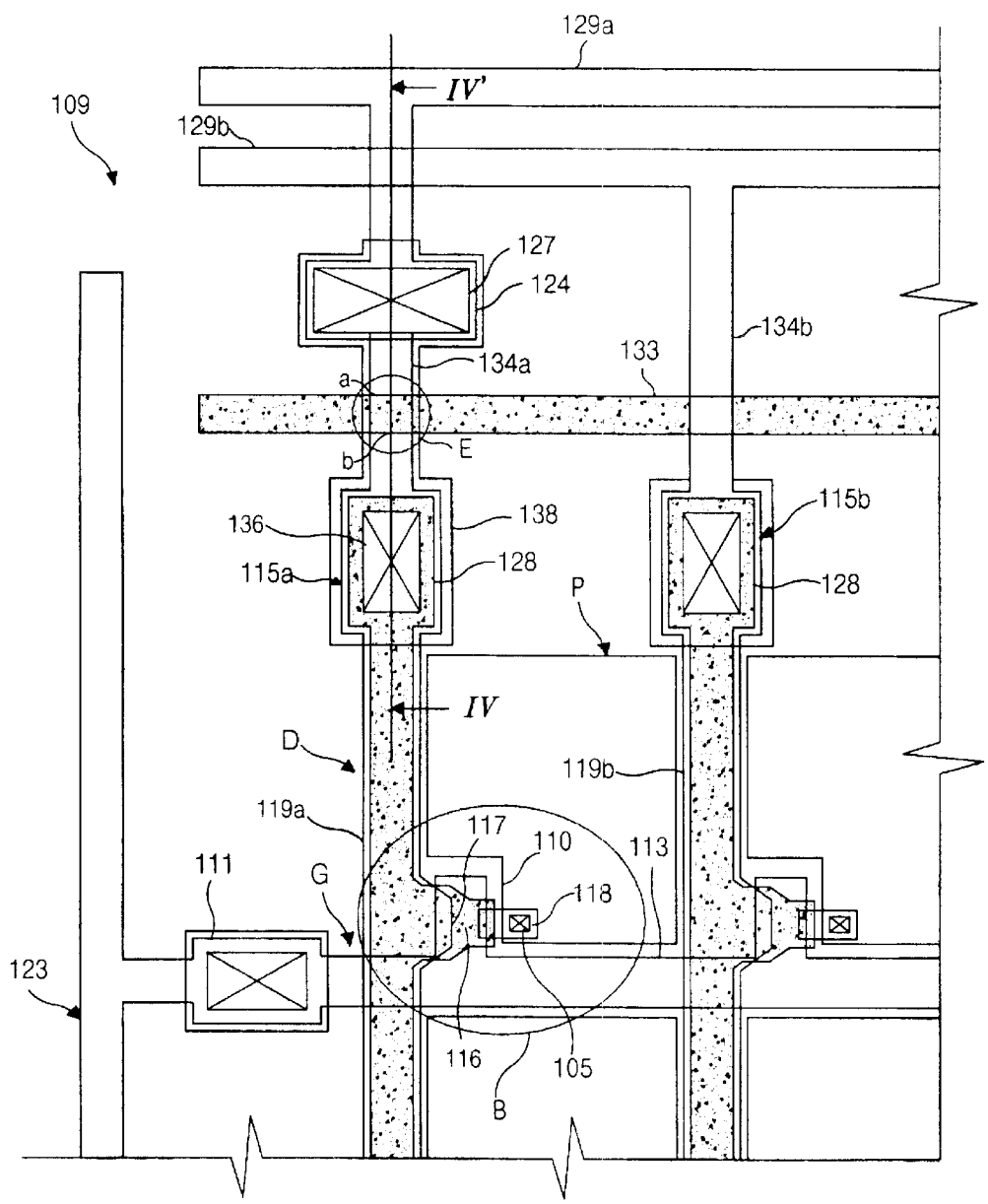
FIG. 3 is a plan view illustrating an array substrate for use in a liquid crystal display device according to a first embodiment of the present invention.

FIG. 3 is a plan view illustrating an array substrate for use in a liquid crystal display device according to a first preferred embodiment of the present invention. As shown in FIG. 3, the LCD device includes gate lines 113 arranged in a transverse direction and data lines 119 arranged in a longitudinal direction perpendicular to the gate lines 113. Gate pads 111 are formed at one terminal portion of the gate lines 113, and odd and even data pads 115a and 115b are formed at one terminal portion of the odd and even data lines 19a and 19b, respectively. Gate shorting bars 123 electrically connects the gate lines 113 with each other. Data shorting bars 129 electrically connect the data lines 119 with each other. Thin film transistors (TFTs) are arranged near a crossing point of the gate and data lines 113 and 119. Pixel electrodes "P" are arranged on a region defined by the gate and data lines 113 and 119.

The gate line 113 includes odd and even gate lines, but one of the odd and even gate lines is not shown (for simplicity). The data lines 119 also include odd and even data lines 119a and 119b. The gate shorting bars 123 include odd and even gate shorting bars. The odd gate shorting bars connect the odd gate lines with each other, and the even gate shorting bars connect the even gate lines with each other, respectively, through the gate pads 111. The odd and even gate shorting bars can be opposite to each other. The data shorting bars 129 also includes odd and even data shorting bars 129a and 129b. The odd data shorting bars 129a connect the odd data lines 119a with each other, and the even data shorting bars 129b connect the even data lines 119b with each other. A first active line 133 electrically connects all of the data lines 119 with each other.

Figure 4:
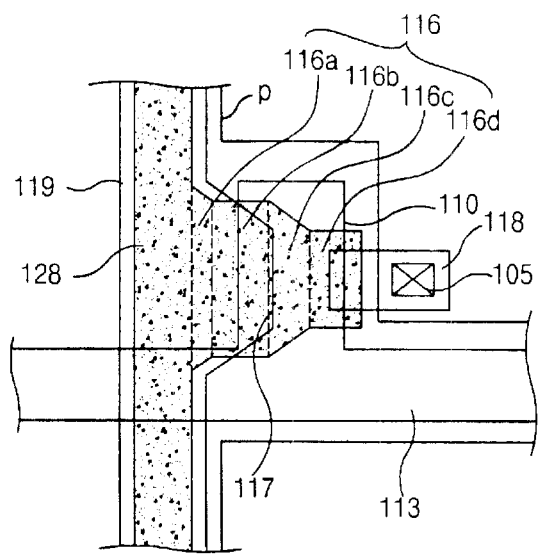
FIG. 4 is an enlarged view illustrating a portion B of FIG. 3.

As shown in FIG. 4, each of the TFTs includes a gate electrode 110, a source electrode 117, a drain electrode 118, and an active layer 116. The gate electrode 110 extends from the gate line 113, and the source electrode 117 extends from the data line 119. The source and drain electrodes 117 and 118 are spaced apart from each other and overlay opposite side portions of the active layer 116, respectively. The drain electrode 118 is electrically connected with the pixel electrode "P" through a drain contact hole 105. The active layer 116 extends from a second active line 128 under the data line 119.

As depicted via dashed lines in FIG. 4, the active layer 116 of the active stratum has the following stacked appearance: a first trapezoid 116a abutting the second active line 128; a rectangle 116b, whose base is smaller than that of the first trapezoid 116a, abutting the first trapezoid 116a on the side opposite to the second active line 128; a second trapezoid 116c, whose base is smaller than that of the first trapezoid 116a, abutting the first rectangle 116b on the side opposite to the first trapezoid 116a; and a second rectangle 116d, whose base is smaller than the base of the second trapezoid 116c, abutting the second trapezoid 116c on the side opposite to the first rectangle 116b.

The shorting bars 123 and 129 are provided for a short-circuit test between the two adjacent gate lines or the two adjacent data lines. In other words, in case of the data lines 119, as described above, since the odd shorting bars 129a connect all of the odd data lines 119a electrically and the even shorting bars 129b connect all of the even data lines 119b electrically, the odd and even shorting bars 119a and 119b are electrically separated from each other. Therefore, it can be tested whether the two adjacent data or gate lines are shorted together or not. Preferably, the even data shorting bar 119b can be formed at the same time as the data line 119. The odd data shorting bar 129a can be patterned along with the gate line 113, and later the odd data shorting bar 129b can be formed at the same time as the data lines 119a and 119b, and then the even data shorting bar 129b can be electrically connected with the odd data lines 19a through a shorting bar contact hole 127 on an extending portion 124 of the odd data shorting bar 129a while the pixel electrode P is formed. Preferably, the even data shorting bar 129b can be made of the same metal as the data line 119, and the odd data shorting bar 129a can be made of the same metal as the gate line 113.

The first and second active lines 133 and 128 can be made of the same material such as amorphous silicon and polysilicon and can be formed before the data lines 119. The first active line 133 serves to discharge charges on all of the odd and even data lines 119a and 119b during a process of manufacturing the TFT. Since the first and second active lines 133 and 128 are made of a semiconductor material, only a high voltage, for example more than 1000 volts, can pass through the first and second active lines 133 and 128. In other words, static electricity has a high voltage of more than 1000 volts, therefore only charges due to static electricity can pass through the first and second active lines 133 and 128. Therefore, since the voltage for a short-circuit test is usually a low voltage, for example, less than 50 volts, a short-circuit test can be smoothly performed regardless of the presence of the first and second active lines 133 and 128, i.e., the first and second active lines 133 and 128 do not represent a short-circuit path relative to low voltages.

Figure 5:
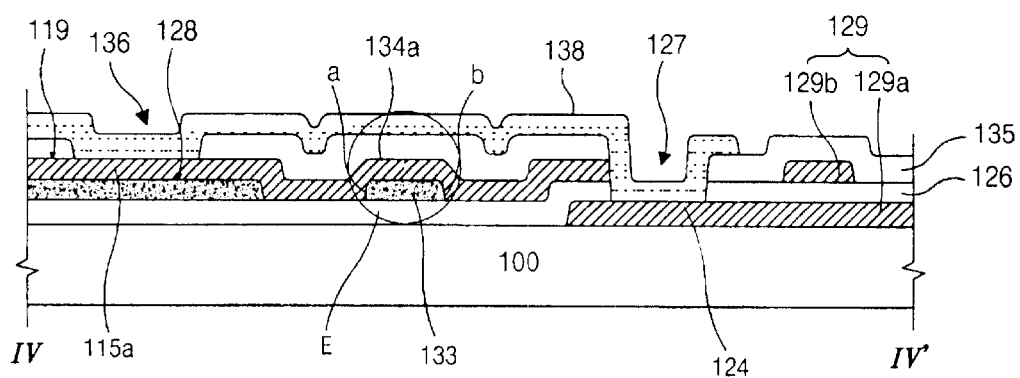
FIG. 5 is a cross sectional view taken along line IV—IV of FIG. 3.

A method of manufacturing the array substrate for use in a liquid crystal display device according to the first embodiment of the present invention will be explained below with reference to FIG. 5. As shown in FIG. 5, a first conductive metal layer is deposited on a partially completed array substrate 100, having gate lines (not shown) on a base substrate (not shown), both of which are covered with an insulating layer (not shown) (the partially completed array substrate hereafter being referred to as a substrate), and is patterned into the odd data shorting bar 129a having the extending portion 124. A first insulating layer 126 is formed on the substrate 100 while covering the odd shorting bar 129a. An intrinsic semiconductor layer and a doped semiconductor layer are sequentially formed on the first insulating layer 126 to produce an active stratum, which is patterned into the first and second active lines 133 and 128.

The second active line 128 has almost the same shape in width as the data line 119 having the data pad 115a that will be formed in a subsequent process. The first and second active lines 133 and 128 can be perpendicular to each other. The first active line 133 is parallel to the data shorting bars 129. Thereafter, a second conductive metal layer is deposited on the exposed surface of the first insulating layer 126 while covering the first and second active lines 133 and 128 and is patterned into the data lines 119a and 119b, the data pads 115a and 115b and the even data shorting bar 129b. As such, both the data lines 119a and 119b are connected to the first active line 133. This step results in a first intermediate structure. The even data pad 115b is connected (not shown in FIG. 5) with the even data shorting bar 129b. Subsequently, a second insulating layer 135 is formed over the whole surface of the first intermediate structure. The second insulating layer 135 is patterned to form the shorting bar contact hole 127 on the extending portion 124 of the odd data shorting bar 129a and a data pad contact hole 136 on the data pad 115a. A connection layer 138 is formed to electrically connect the odd data line 119a with the extending portion 124 of the odd shorting bar 129a.

The first conductive metal layer, the second conductive layer and the connection layer can be formed of a metal such as Al, Cu, Cr, Mo, Ti, W, etc. The connection layer can also be formed of a transparent conductive material such as ITO. The insulating layers can be formed of $SiO_x$ or $SiN_x$.

As described above, the first active line 133 is electrically connected with all of the odd and even data lines 119a and 119b, even before the odd data shorting bar 129a is electrically connected with the odd data lines 119a. As a result, charges due to the static electricity generated during a process of manufacturing the TFT can be discharged through the first active line 133, thereby preventing a short-circuit between the data line 119 and the gate electrode 110 due to the accumulated charges.

However, as shown in FIG. 5, a step difference occurs at a crossing point of the data pad connecting portion 134a and the first active line 133, i.e., at a portion E of FIG. 5. Therefore, there is a possibility of a line defect such as an open circuit in the data pad-connecting sub-portion 134a at step portions, a and b. For example, during the photolithography process, the photoresist may be separated a little from the data pad-connecting portion 134a, so that an etchant may etch a portion of the data pad connecting portion 134a under the photoresist separated.

Figure 6:
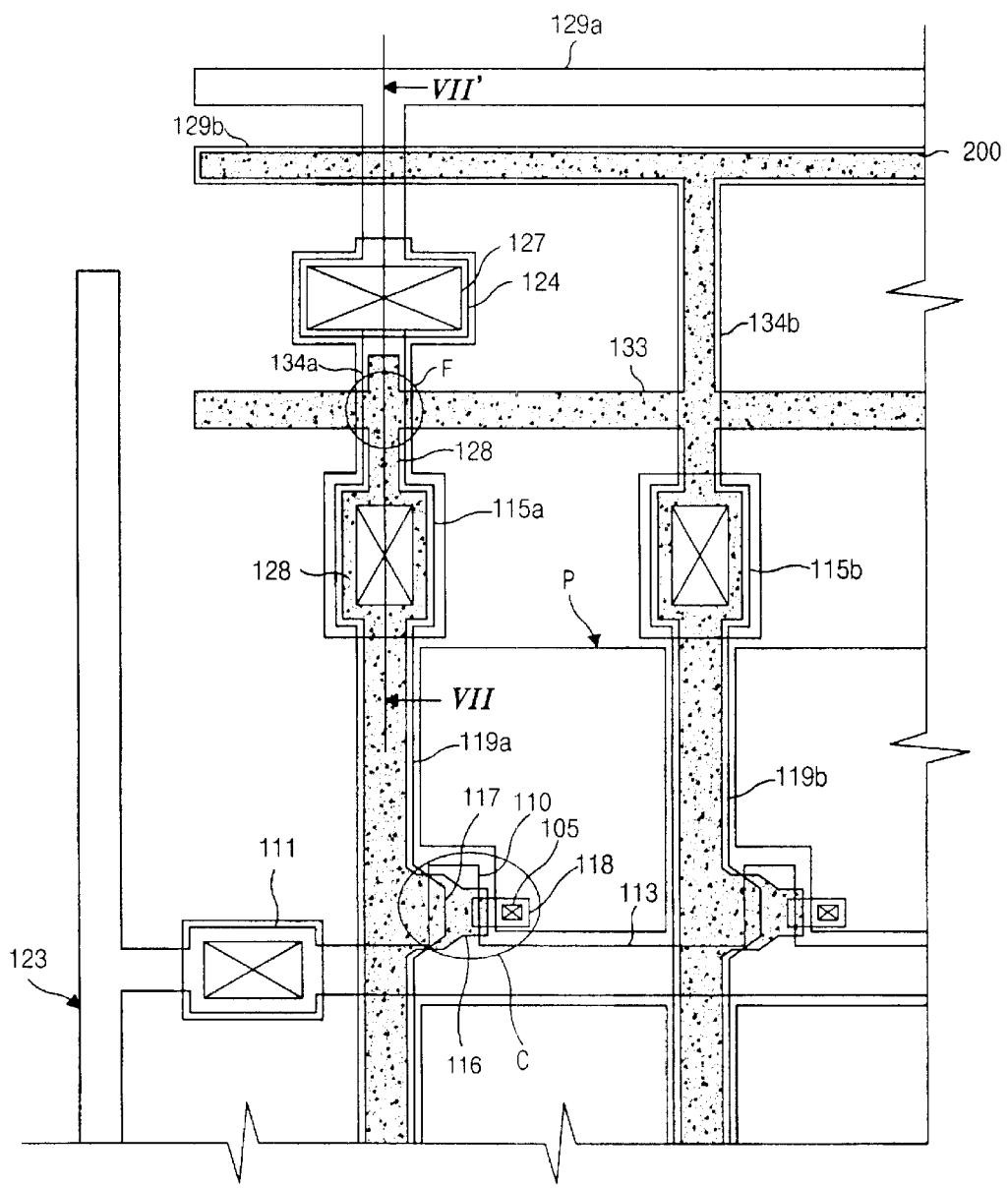
FIG. 6 is a plan view illustrating an array substrate for use in a liquid crystal display device according to a second embodiment of the present invention.
Figure 7:
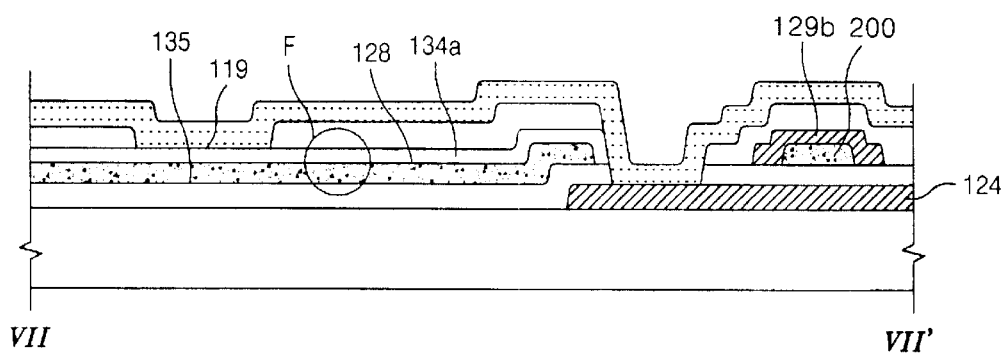
FIG. 7 is a cross sectional view taken along line VII—VII of FIG. 6.

To overcome the problem described above, a second embodiment of the present invention provides a data pad connecting portion having no step portion. As shown in FIG. 6, an array substrate according to the second embodiment of the present invention has almost the same structure except for the active stratum. To remove the step portions of the data pad connecting portions, a and b, the active stratum is formed under all of a conductive metal layer that forms the data line 119, the data pad 115 and the even data shorting bar 129b in the same manner as described in relation to the formation of lines 128 and 133 of FIG. 3. Therefore, as shown in FIG. 7, a step portion due to the active line is not present. The active stratum includes a first active line 133, an extended second active line 128 and a third active line 200, which are connected with each other via an extended portion 134b (as shown in FIG.6). The third active line 200 enhances the attachment of the even data shorting bar 129b the first insulating layer 126.

Like the first embodiment of the present invention, since the first active line 133 is connected with all of the odd and even data lines 119a and 119b, even before the odd data shorting bar 129a is electrically connected with the odd data lines 119a charges due to the static electricity generated during a process of manufacturing the TFT can be discharged through the active stratum. This prevents a short-circuit between the data line 119 and the gate electrode 110 due to the accumulated charges. Further, a line defect such as an open circuit is prevented because the data pad connecting portion 134 has no step portion.

As described above, the array substrate for use in a liquid crystal display device according to the preferred embodiment of the present invention has a structure that discharges static charges on the gate and data lines generated during a process of manufacturing the TFT. As such, a short-circuit between the data line and the gate electrode can be prevented. And, for some embodiments, since the data pad connecting portion has no step portions, a line defect such as an open circuit is prevented. As a result, the array substrate has a high manufacturing yield.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An array substrate for use in a liquid crystal display device, the array substrate comprising:
   gate lines arranged in a transverse direction and organized as odd and even gate lines;
   data lines arranged in a longitudinal direction perpendicular to the gate lines and organized as odd and even data lines;
   gate shorting bars organized as odd and even gate shorting bars, the odd gate shorting bar electrically connecting all of the odd gate lines, the even gate shorting bar electrically connecting all of the even gate lines;
   data shorting bars organized as odd and even data shorting bars, the odd data shorting bar electrically connecting all of the odd data lines, the even data shorting bar electrically connecting all of the even data lines; and
   a first line arranged in a transverse direction, external to a data pad, connecting all of the data lines, wherein said first line is made of one material to conduct current uniformly in forward and reverse directions.

2. The array substrate of claim 1, wherein the first line is made of a semiconductor material.

3. The array substrate of claim 2, wherein the semiconductor material includes one of amorphous silicon and polysilicon.

4. The array substrate of claim 1, further comprising second lines arranged under the data lines.

5. The array substrate of claim 4, wherein the first and second lines are made of a semiconductor material.

6. The array substrate of claim 5, wherein the semiconductor material is one of amorphous silicon and polysilicon.

7. The array substrate of claim 4, wherein the first and second lines are arranged on the same plane.

8. The array substrate of claim 4, wherein the first line is perpendicular to the second line.

9. The array substrate of claim 4, further comprising a third line formed under the even shorting bar.

10. The array substrate of claim 9, wherein the first, second and third lines are formed from the same stratum of one or more materials and are electrically connected with each other.

11. The array substrate of claim 10, wherein the first, second and third lines are made of a semiconductor material.

12. The array substrate of claim 11, wherein the semiconductor material is one of amorphous silicon and polysilicon.

13. A method of manufacturing an array substrate for use in a liquid crystal display device, the method comprising:
   providing a first intermediate structure having gate lines and an odd data shorting bar on a base substrate, the gate lines being organized as odd and even gate lines, and a first insulating layer on the base substrate and the gate lines;
   forming an active stratum of one or more materials on the first insulating layer, the active stratum having a first line, formed external to a data pad, adjacent to and parallel to the odd data shorting bar, wherein said first line is formed of one material to conduct current uniformly in forward and reverse directions;
   forming data lines and an even data shorting bar on the active stratum and the first insulating layer to produce a second intermediate structure, the data lines being organized as odd and even data lines and being electronically connected with the first line, the even data shorting bar electrically connecting all of the even data lines;
   forming a second insulating layer on the second intermediate structure; and
   forming a connection layer to electrically connect the odd data shorting bar with all of the odd data lines.

14. The method of claim 13, wherein the active stratum further includes second lines formed under the data lines.

15. The method of claim 14, wherein the first line is perpendicular to the second lines.

16. The method of claim 15, wherein a third line is formed, and the first, second and third lines are electrically connected with each other.

17. The method of claim 16, wherein the first line is perpendicular to the third line.

18. The method of claim 13, wherein the active stratum is made of a semiconductor material.

19. The method of claim 18, wherein the semiconductor material includes one of amorphous silicon and polysilicon.

20. The array substrate of claim 1, further comprising layer projections off the second lines, wherein each projection has the following stacked shape: a first trapezoid abutting the second line; a first rectangle smaller in base width than, and abutting, the first trapezoid; a second trapezoid, smaller in base width than the first trapezoid and abutting the first rectangle; and a second rectangle smaller in base width than, and abutting, the second trapezoid.

21. The method of claim 14, wherein the second lines have layer projections extending therefrom, each projection having the following stacked shape: a first trapezoid abutting the second line; a first rectangle smaller in base width than, and abutting, the first trapezoid; a second trapezoid, smaller in base width than the first trapezoid and abutting the first rectangle; and a second rectangle smaller in base width than, and abutting, the second trapezoid.

* * * * *